S. DEUTSCH.
MOTOR GEARING AND HOUSING.
APPLICATION FILED JUNE 16, 1913.
1,111,884.
Patented Sept. 29, 1914.
2 SHEETS—SHEET 1.
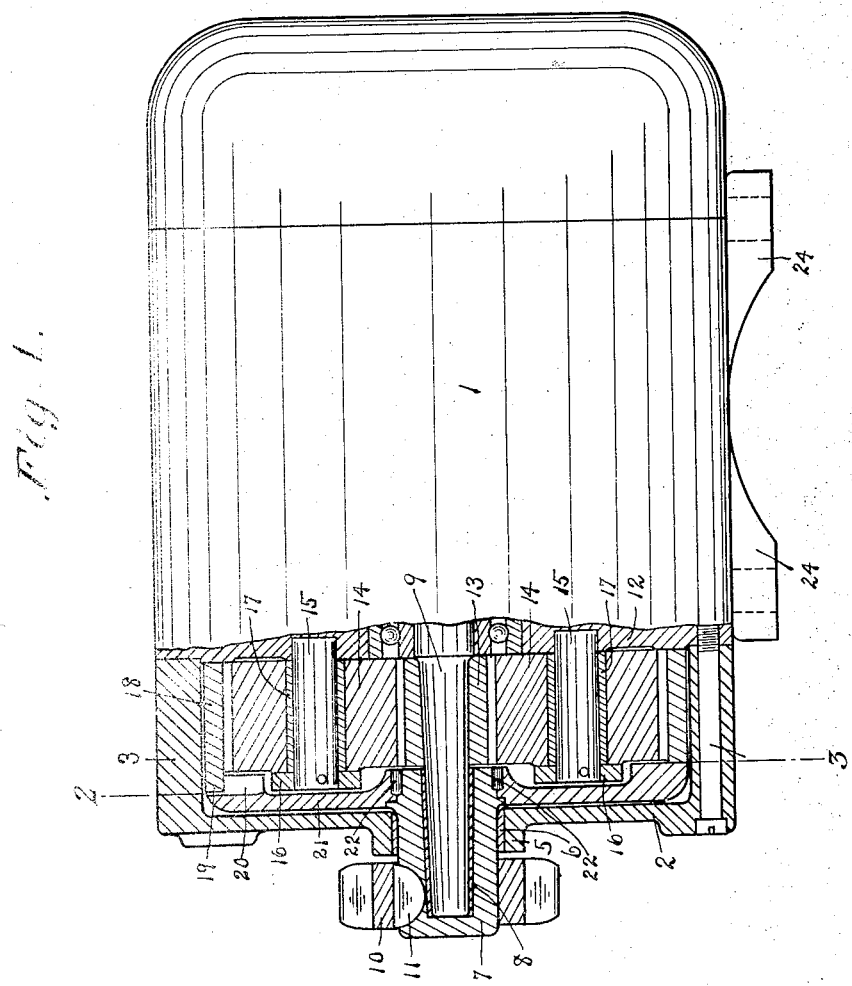
WITNESSES:
C. M. Huffman.
Hugo W. Kreinbring
INVENTOR
Simon Deutsch.
BY
Edward N. Pagelsen
ATTORNEY

S. DEUTSCH.
MOTOR GEARING AND HOUSING.
APPLICATION FILED JUNE 16, 1913.

1,111,884.

Patented Sept. 29, 1914.
2 SHEETS—SHEET 2.

Witnesses
C. M. Huffman
Hugo W. Kreinbring

Inventor
Simon Deutsch
By Edward N. Pagelsen
Attorney

UNITED STATES PATENT OFFICE.

SIMON DEUTSCH, OF DETROIT, MICHIGAN.

MOTOR GEARING AND HOUSING.

1,111,884.  Specification of Letters Patent.  Patented Sept. 29, 1914.

Application filed June 16, 1913. Serial No. 773,923.

*To all whom it may concern:*

Be it known that I, SIMON DEUTSCH, a citizen of the United States, and a resident of Detroit, in the county of Wayne and State of Michigan, have invented a new and Improved Motor Gearing and Housing, of which the following is a specification.

This invention relates to means for transmitting the power of the armature shafts of electric motors at reduced speeds, and its object is to provide a housing and gearing within the housing which shall be composed of the fewest number of parts; shall be entirely inclosed in the housing; and shall occupy the least possible space.

This invention consists in combination with a shell or housing connected to the housing of an electric motor, of a plurality of stationary shafts, pinions revolubly mounted on said shafts, an internal gear with which the pinions are in mesh, a sleeve connected to said internal gear and revoluble in the housing concentric with the armature shaft of the motor, and a pinion on the armature shaft meshing with the pinions on the stationary shafts.

This invention further consists in forming the internal gear with which the pinions on the stationary shaft are in mesh, of two parts so that there will be no binding in case the internal gear or the armature shaft should get out of alinement with the housing.

Figure 3:
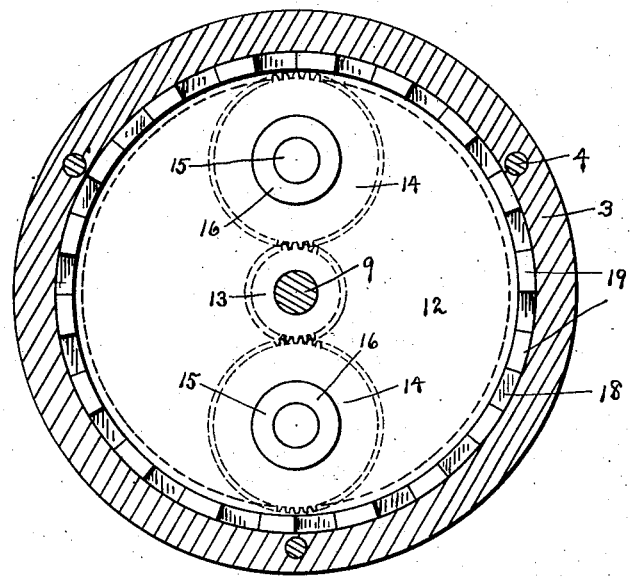
Figure 2:
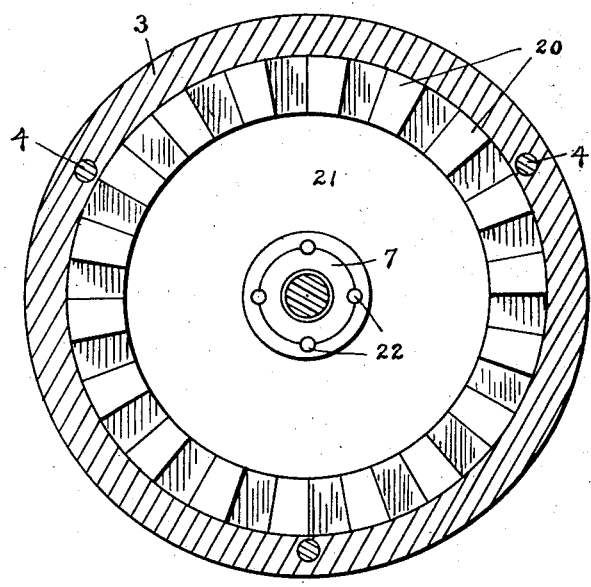

In the accompanying drawings Figure 1 is an elevation of a motor housing and a central longitudinal section of the auxiliary housing and the gearing within. Figs. 2 and 3 are sections on the line 2—3 of Fig. 1, Fig. 2 looking toward the left, and Fig. 3 toward the right.

Similar reference characters refer to like parts throughout the several views.

This gear housing and the parts contained therein are attached to the housing of an electric motor, and are especially adapted for use in electric starting devices for internal combustion engines. To the housing 1 of the motor is secured a cup-shaped auxiliary housing comprising a head 2 and a cylindrical portion 3 by means of screws 4. A cylindrical bearing 5 on the head 2 may be provided with a bushing 6 in which is revoluble a sleeve or thimble 7. This thimble may be provided with an anti-friction bushing 8 in which the outer end of the armature shaft 9 is revoluble, and on it may be secured a toothed wheel 10 of any desired type by means of a key 11.

Secured to the armature shaft 9 is a pinion 13 which meshes with a plurality of idler pinions 14 mounted on the stationary shafts 15, carried by the head 12 of the housing 1. Collars 16 on the ends of these shafts prevent the pinions 14 from moving endwise, and if desired, these pinions may be provided with anti-friction bushings 17. Revolubly mounted in the cylinder 3 of the gear housing is an internal gear 18 which meshes with the pinions 14 on the shafts 15. This internal gear 18 is made to loosely fit the cylinder 3 and is provided with teeth 19 along one edge, such as shown in Fig. 2. These teeth 19 mesh with the radial teeth 20 on the disk 21, which disk is secured to the thimble 7 in any desired manner, pins 22 preferred.

By the use of the pinion 13 and the internal gear 18 of unequal diameters, the speed of the two will be in inverse proportion to the diameters of their pitch lines, and the speed of the wheel 10 may be one-fifth of that of the armature and even less, if desired. This is an important factor in starting devices for automobile engines where heavy torque is desired.

Should the bushing 6 in the flange 5 wear in such a manner that the thimble 7 is out of alinement with the cylinder 3 and the internal gear 18, then the teeth 19 and 20 on the gear 18 and the disk 21 will permit this disk and gear to adjust themselves to the varying conditions, and thus prevent any possible binding and the resulting excessive friction. The housing 1 may be secured to any portion of the supporting mechanism by means of bolts passing through the feet 24. Power may be transmitted from the toothed wheel 10 by means of any desired connections. The sizes of the teeth 19 and 20, their number, and the proportions of the different parts, may all be changed by those skilled in the art without departing from the spirit of my invention.

I claim.

1. In a electric motor, the combination of a main housing, an auxiliary housing secured thereto and consisting of a disk and a cylinder connected thereto, a bearing in said disk, a thimble revolubly mounted in said bearing, a disk connected thereto and provided with radial teeth, an internal gear revolubly mounted within the auxiliary housing and having teeth along its edges in mesh with the teeth on said disk, a plurality of stationary shafts mounted on said main housing, pinions on said shafts in mesh with said internal gear, an armature shaft revoluble in said thimble, and a pinion mounted on said armature shaft in mesh with the pinions on said stationary shafts.

2. In an electric motor, the combination with an armature shaft, a pinion thereon, an internal gear concentric therewith, a plurality of idler pinions meshing with the internal gear and the pinion on the armature shaft, a stationary shaft for each of said idler pinions, a housing for said gear, a bearing carried by the housing, a sleeve revoluble in the bearing concentric with the armature shaft, and a driving connection between the sleeve and the internal gear whereby they may move transversely in respect to each other without causing binding between them.

3. In an electric motor, the combination of a housing for the motor, a cup-shaped gear case secured thereto, an internally toothed annulus revolubly mounted in the casing, a disk revolubly mounted in the casing and having operative toothed connection with the annulus permitting movement transversely thereto, a driving pinion mounted on the disk, a pinion mounted on the armature shaft of the motor, and idler pinions between the pinion on the armature shaft and the annulus.

4. In an electric motor, the combination of a main housing, an auxiliary housing secured thereto and consisting of a disk and a cylinder connected thereto, a bearing in said disk, a thimble revolubly mounted in said bearing, a disk connected thereto, an internal gear revolubly mounted within the auxiliary housing and connecting to said disk, a plurality of stationary shafts mounted on said main housing, pinions on said shafts in mesh with said internal gear, an armature shaft revoluble in said thimble, and a pinion mounted on said armature shaft in mesh with the pinions on said stationary shafts.

5. In an electric motor, the combination with an armature shaft, a pinion thereon, an internal gear concentric therewith, a plurality of idler pinions meshing with the internal gear and the pinion on the armature shaft, a stationary shaft for each of said idler pinions, a housing for said gear, a bearing carried by the housing, a sleeve revoluble in the bearing concentric with the armature shaft, and a disk within the gear housing rigidly connected to said sleeve and having projections slidably engaging the internal gear.

6. In an electric motor, the combination of an armature shaft, a housing and a bearing formed thereon, a revoluble driving member mounted in said bearing, and a connection between the armature shaft and said driving member whereby they may move transversely in respect to each other without causing binding between them.

7. In an electric motor, the combination of an armature shaft, a housing and a bearing formed thereon, a revoluble driving member mounted in said bearing, a gear on said armature shaft, and a connection between the armature shaft and said driving member whereby they may move transversely in respect to each other without causing binding between them.

8. In an electric motor, the combination of an armature shaft, a housing and a bearing formed thereon, a revoluble driving member mounted in said bearing, a gear on said armature shaft, gears meshing therewith and revolubly mounted on the housing, and a connection between the gears and the driving member whereby they may move transversely in respect to each other without causing binding between them.

In testimony whereof I have signed this specification in the presence of two subscribing witnesses.

SIMON DEUTSCH.

Witnesses:
EDWARD N. PAGELSEN,
HUGO W. KREINBRING.

Copies of this patent may be obtained for five cents each, by addressing the "Commissioner of Patents, Washington, D. C."